United States Patent [19]

Graf

[11] Patent Number: 4,901,271
[45] Date of Patent: Feb. 13, 1990

[54] COMPUTATIONAL NETWORK

[75] Inventor: Hans P. Graf, East Keansburg, N.J.

[73] Assignee: American Telephone and Telegraph Company, AT&T Bell Laboratories, Murray Hill, N.J.

[21] Appl. No.: 293,598

[22] Filed: Jan. 4, 1989

Related U.S. Application Data

[63] Continuation-in-part of Ser. No. 5,248, Jan. 20, 1987, abandoned.

[51] Int. Cl.$^4$ ............................................. G06G 7/02
[52] U.S. Cl. .................................... 364/807; 364/513
[58] Field of Search ............................. 307/201, 202.1; 364/513, 807

[56]    References Cited
U.S. PATENT DOCUMENTS

| | | | |
|---|---|---|---|
| 4,560,977 | 12/1985 | Murakami et al. | 364/807 X |
| 4,737,929 | 4/1988 | Denker | 364/807 |
| 4,782,460 | 11/1988 | Spencer | 364/807 |

OTHER PUBLICATIONS

"Neurons With Graded Response Have Collective Computational Properties Like Those of Two-state Neurons", J. J. Hopfield. Proc. Natl. Sci., U.S.A. (1984), vol. 81, pp. 3088–3092.

"'Neural' Computation of Decisions in Optimization Problems", J. J. Hopfield & D. W. Tank, Biological Cybernetics, (1985), vol. 52, pp. 141–152.

"New Deigns for Associative, Content Addressable memory", E. Baum, J. Moody and F. Wilczck, 15 pages.

Primary Examiner—Steven Mottola
Attorney, Agent, or Firm—Henry T. Brendzel

[57] ABSTRACT

A new associative computation network that is capable of storing multi-bit vectors includes a decision network and a feedback arrangement that, functionally, is separable into serially connected networks. The first network has its inputs connectd to the outputs of the decision network and is arranged to develop sets of excitatory and inhibitory drive signals. Each set corresponds to a stored vecor. For each different output state of the decision network, a different one of the drive signal sets appears at the output of the first network. The output leads of the first network, which may also be employed as the input interface leads, are connected to the second network. The second network develops output signals, applied to inputs of the decision network, which are proportional to the projection of the input signals applied to the second network on the stored vectors.

36 Claims, 7 Drawing Sheets

COMPUTATIONAL NETWORK

This is a continuation in part under 37 CFR 1.62 of U.S. patent application Ser. No. 07/005,248 filed Jan. 20, 1987, and titled "A COMPUTATION NETWORK."

BACKGROUND OF THE INVENTION

This invention relates to electronic computation networks, and more particularly, to highly parallel associative computation networks that are also known as neural networks.

Electronic neural networks have been described by J. J. Hopfield in "Neurons With Graded Response Have Collective Computational Properties Like Those of Two-state Neurons", Proc. Natl. Sci., USA Vol. 81, pp. 3088-3092; and by J. J. Hopfield and D. W. Tank in "'Neural' Computation of Decisions in Optimization Problems", Biological Cybernetics, Vol. 52, (1985), pp. 141-152; as well as in U.S. Pat. No. 4,719,591 issued Jan. 12, 1988, J. J. Hopfield and D. W. Tank and U.S. Pat. No. 4,660,166 issued Apr. 21, 1987, J. J. Hopfield.

Basically, the Hopfield neural network described in the above references is a highly parallel computational circuit comprising a plurality of amplifiers, with each of the amplifiers feeding back its output signal to itself and all of the other amplifiers through conductance $T_{ij}$. The $T_{ij}$ conductances (where $T_{ij}$ denotes the conductance between the output of amplifier j and the input of amplifier i) and the associated connections can be thought of as comprising a feedback network which has one output signal set and two input signal sets. The output signal set is applied to the amplifier inputs, one of the input signal sets is derived from the amplifier outputs, and the other input signal set is responsive to input stimuli applied to the neural network. As shown in the prior art, one can explicitly specify the values of the $T_{ij}$ conductances to achieve predetermined results, such as reaching different specified output states of the amplifier in response to different ranges of input stimuli. Also as described in the prior art, an input interconnection network may be interposed between the input stimuli and the second set of inputs of the feedback network. The input interconnection network permits manipulation of the expected input signals to corresponding signals that drive the feedback network and the amplifiers.

The neural network model described most extensively in the prior art is one with symmetric couplings, i.e., the connections between pairs of neurons satisfy the relationship $T_{ij} = T_{ji}$. The dynamics of such a network is relatively simple. The system moves in the direction of reducing a global energy function of the circuit, E, to states that are local minima of E, and once a local minimum is reached, the circuit remains at the stable state until perturbed by a sufficiently large input signal that moves the circuit to a different local minimum. The local minima may be thought of as the stored "memories" that are characterized by the vectors $M^\nu$. An associative memory can be constructed with the Hopfield neural network by constructing the connection strengths $T_{ij}$ in accordance with the outer product, or Hebb, rule; to wit, by assigning $$T_{ij} = \sum_{\nu=1}^{n} M_i^\nu M_j^\nu$$

for $j \neq i$, and 0 otherwise. In a very simple embodiment $T_{ij} = -1$ (an inhibitory connection) for $i \neq j$ and 0 otherwise, resulting in a network that behaves as an n-flop; that is, a multi-output version of the well-known, two-output network commonly known as a flip-flop.

The Hopfield neural network is a very robust network, in the sense that it is able to associatively recall the stored memories even when the input is heavily distorted by noise, or when some of the hardware connections are inoperative. On the other hand, the Hopfield network must be sparsely populated with stored information, and some work has been done which indicates that the number of stored vectors in a Hopfield network should be limited to approximately 0.15N, where N is the number of amplifiers. Also, computation of the $T_{ij}$ values in the Hopfield network (for the general case) is not easy, and the precise location of the boundaries between regions of attraction of the memories is not easily controlled.

It is an object of this invention to provide a network structure that allows for simple and efficient programming of the memories into the network.

It is another object of this invention to provide an arrangement that can easily be implemented in integrated circuit technology.

SUMMARY OF THE INVENTION

These and other objects and advantages are realized with a new associative computation network that is capable of storing K vectors of N bits each. It includes a decision network (e.g., a K-flop network) and a feedback arrangement that, functionally, is separable into two serially connected networks. The first network has its inputs connected to the outputs of the decision network and is arranged to develop K sets of excitatory and inhibitory drive signals. Each set corresponds to a stored vector and, more specifically, each "1" in the stored vector gives rise to an excitatory drive signal while each "0" gives rise to an inhibitory drive signal. For each different output state of the decision network, a different one of the K sets appears at the output of the first network. The output leads of the first network, which may also be employed as the input interface leads to my associative computation neural network, are connected to the second network. The second network develops K output signals that are applied to inputs of the decision network. The output signals of the second network are proportional to the projection of the input signals applied to the second network on the stored vectors. In one embodiment, the projection is obtained with connections in the second network that are excitatory when the applied input is excitatory and the corresponding component in the stored vector is a "1", and non-excitatory otherwise. This corresponds to an AND function of the inputs signals to the second network with the stored vectors. In another embodiment, the projection is obtained with an Exclusive NOR projection of the inputs signals to the second network with the stored vectors. In still another embodiment there is included another set of amplifiers that is interposed between the output of the first network and the input of the second network. A correlator application is also described.

BRIEF DESCRIPTION OF THE DRAWING

FIG. 9 depicts another computation network embodiment embodying the principles of this invention.

DETAILED DESCRIPTION

Figure 1:
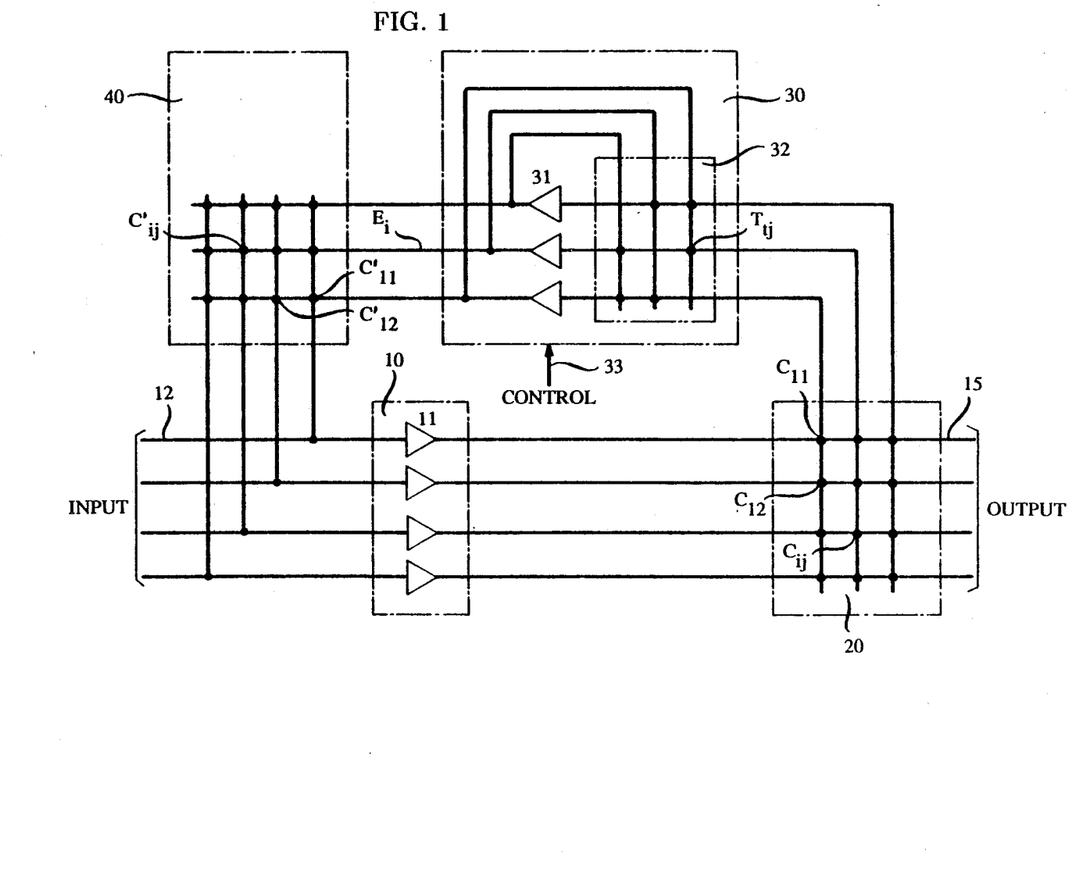
FIG. 1 presents a schematic diagram of my associative computation network.

FIG. 1 presents a diagram of one embodiment reflecting the principles of my invention. It comprises a vector units network 10, a template projection network 20, a decision network 30, and a template generator network 40; all interconnected in a feedback loop. A careful perusal of FIG. 1 would reveal that the demarcation lines between the various above-named segregated units is largely arbitrary, but it is convenient to choose some borders so that a functional description of the circuit is made easier. Indeed, as shown infra, some of the segregated units may be coalesced to form more compact realizations of my invention.

Vector units network 10 in FIG. 1 serves as the gateway into which input signals are injected via lines 12 and from which the output signals are derived via lines 15. More specifically, network 10 comprises N amplifiers 11, where N is the number of bits that each output vector is desired to have. Input signals are fed into the inputs of amplifiers 11, and the output signals of the FIG. 1 network are obtained from the output signals of amplifiers 11. In addition to comprising the outputs of the FIG. 1 neural network, the outputs of amplifiers 11 are fed to template projection network 20. Network 20 comprises N input leads and K output leads, where K is the number of stored "memories", or stable states, of the FIG. 1 network. These stable states form a set of the desired output vectors (each being N bits long). The input and output leads of network 20 form a grid, and the junction points of the grid comprise interconnection nodes which, for convenience, are designated $C_{ij}$, where i marks the output lead and j marks the input lead of network 20. With this arrangement, the $i^{th}$ output line of network 20 drives the subsequent network (network 30) with a signal that is related to $$\sum_{j=1}^{K} A_j C_{ij},$$

where A is the output voltage of the $j^{th}$ amplifier 11.

In accordance with the principles of my invention, the collection of interconnection nodes for each of the K output leads of network 20 is related to a stored vector. That is, each stored vector $M_i$ is defined by bits $M_{i1}, M_{i2}, \ldots M_{ij}, \ldots M_{iN}$ and is embodied, in a sense, in $C_{i1}, C_{i2}, \ldots C_{ij}, \ldots C_{iN}$. The correspondence between each $C_{ij}$ and $M_{ij}$ (i.e., the manner imparting the $M_{ij}$ information to the connection) relates to the metric that is selected, as described in greater detail below. Basically, however, the $C_{ij}$ connections develop a measure of how closely the input signals reflect the expected output vector. Stated even more generally, any arrangement of $C_{ij}$ is acceptable as long as the output signals of network 20 provide a measure by which the projection of the input signals on the stored vectors can be ascertained. Typically, that means that the $C_{ij}$ connections are such that when network 10 resides at a state which corresponds to one of the stored vectors, network 20 develops output signals where one and only one of the output lines of network 20 provides a maximum drive to network 30.

As an example of $C_{ij}$ connections, when the stored vectors are such that no stored vector subsumes any other stored vector, then the $C_{ij}$ connections can be selected to be excitatory when the $j^{th}$ bit of the stored vector is a "1" and non-excitatory when the $j^{th}$ bit of the stored vector is a "0". (An excitatory connection is one that affects the voltage of a lead to which $C_{ij}$ is connected that tends to turn a subsequent amplifier "on", a non-excitatory connection is one that has no effect on a subsequent amplifier, and an inhibitory connection is one that tends to turn a subsequent amplifier "off." Sometimes there is not practical difference between a non-excitatory connection and an inhibitory connection.) Thus, with a set of stored vectors that do not subsume each other, the connections $C_{ij}$ can correspond to $$C_{ij} = \text{AND}(V_j, M_{ij}),$$

where AND stands for the logical AND function, and $V_j$ takes on the logic value "1" when the $j^{th}$ amplifier 11 is "on" and logic "0" otherwise.

In applications where the above limitation on the stored vectors is not acceptable, the character of the connections can, for example, be selected to follow the equation $$C_{ij} = \text{EXNOR}(V_j, M_{ij}),$$

where EXNOR is the logical Exclusive NOR function. Other metrics are, of course, also possible.

It should be noted, perhaps, that the above two metrics are different from the one used in the prior art neural network feedback loop, where the algebraic product ($T_{ij}U_j$) is employed and where the $T_{ij}$ values are multiplicative constants. The above metrics, on the other hand, utilize logical relationships. It should not be viewed, however, that my invention is limited to logical relationships. To the contrary, the above examples aim to show that the connections in my invention can have algebraic, logical, or any other useful functional relation to the stored vectors.

As indicated above, the output leads of template projection network 20 are connected to decision network 30. The function of network 30 is to respond to the projection signals developed by network 20 and develop therefrom the drive signals for network 40 that would place network 10 in a state that corresponds to the one vector stored in network 40 that is closest to the input signals appearing at network 20.

Figure 2:
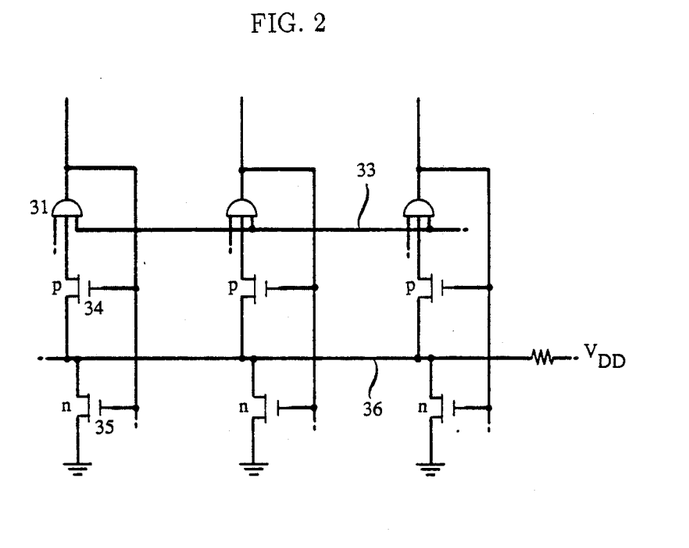
FIG. 2 shows an efficient realization of the decision network in FIG. 1.

In many applications the function of network 30 comes down to selecting the output line of network 20 with the largest driving function and turning "on" a corresponding output line of network 30 while turning "off" all other output lines of network 30. That is, in such applications the input to network 30 is a set of K signals, with one input signal (e.g., $p^{th}$) being the largest. The output of network 30 is also a set of K signals, $E_1$, $E_2$, ... $E_K$, with one output signal (e.g., $E_p$) being high, or "on," and all other output signals being "off". This mutually inhibiting type of network 30 is achieved in the FIG. 1 network with a simple K-flop Hopfield network (described above) of K amplifiers 31 and a local feedback network 32, where the $T_{ij}$ connection coefficients in feedback network 32 follow the relationship $T_{ij} = -1$ when $i \neq j$ and 0 otherwise. A different realization of a K-flop network is shown in FIG. 2 and described below.

The K-flop realization for network 30 is the simplest, but it certainly is not the only one. For example, a "largest" projection signal at the input to network 30 may be designed to turn "on" more than one output line of network 30, or designed to induce different analog signals at the outputs of network 30.

Turning attention again to FIG. 1, the output signals of network 30 are applied to template generator network 40. Structurally similar to network 20, template generator network 40 has K input leads and N output leads that internally form a grid. The junction points of the grid comprise interconnection nodes which, for convenience, are designated $C'_{ij}$, where i marks the $i^{th}$ input lead and j marks the $j^{th}$ output lead of network 40. Since network 40 is the template generator network, in applications where network 30 is a K-flop the connectivity is $C'_{ij} = M_{ij}$, where $C'_{ij} = 1$ corresponds to an excitatory connection, and $C'_{ij} = 0$ corresponds to an inhibitory connection. The output leads of network 40 are connected to the inputs of vector units network 10, and in this manner network 40 strives to maintain network 10 at a state that corresponds to one of the stored vectors.

Although a specific interconnection approach is described above for network 40 ($C'_{ij}$), it should be realized that any drive approach will do as long as the input lines to network 40 cause the delivery of a set of drive signals that tend to place network 10 at a state that corresponds to a stored vector. Of course, a K-flop input to network 40 does result in a very simple correspondence between the stored vectors and the $C'_{ij}$ connections.

To assist in moving the network of FIG. 1 to a different state, network 30 includes a control lead 33 that turns "off" all of the amplifiers in network 30. When control 33 is activated, amplifiers 33 develop no output voltage, and that condition disables the inhibitory action of network 32 and the driving action of network 40 (driving the amplifiers of network 10). Input lines 12 are then employed to apply an appropriate voltage to each amplifier 11, placing network 10 in a different state. In accordance with the above described operation of network 20, the new state of network 10 develops a set of template projections onto the output lines of network 20. The output line of network 20 whose $C_{ij}$ connections correspond to a stored vector that is closest (by the metric chosen) to the newly forced state of network 10 is now the one that injects the maximum current into network 30. As control 33 is deactivated, the input line with the largest injecting current is the first one to turn its corresponding amplifier "on", and that amplifier inhibits all other amplifiers via network 32 in accordance with the K-flop action of network 30. The output line of network 30 that is turned "on" causes template generator network 40 to appropriately apply excitatory and inhibitory signals to the various amplifiers in network 10, placing the network into the quiescent state corresponding to the vector that matches most closely (has largest projection value in accordance the metric chosen for network 20) to the state to which network 10 was initially placed by the applied input.

FIG. 2 presents an efficient realization of the K-flop decision network 30. In FIG. 2, amplifiers 31 are implemented in the form of three-input AND gates, where the output of each AND gate 31 is connected to a serial connection of two complementary MOS switches 34 and 35 that are connected between one of the AND gate inputs and ground. A second input of all AND gates 31 is connected to control line 33, and the remaining inputs of AND gates 31 form the inputs to network 30. Switches 34 and 35 in FIG. 2 are a p-channel switch 34 and an n-channel switch 35. Switch 34, connected to the AND gate's input, is open when its control voltage is high and closed when its control voltage is low. Conversely, gate 35 is closed when its control voltage is high and open when its control voltage is low. The junction points of the complementary switches are all connected to a source $V_{DD}$ via inhibit line 36 and a resistor. In operation, a low voltage on control lead 33 disables gates 31. Consequently, switches 34 are closed, switches 35 are open, and line 36 is high. As soon as control lead 33 goes high, gates 31 begin to turn "on" under the influence of the drive signals applied to network 30. The gate with the largest drive signal turns "on" first, and it reverses the states of the switches connected to it. The associated switch 35 drives line 36 to a low state and, through closed switches 34, the low level on line 36 causes all gates 31 to turn "off"; except the gate that turned "on" first, (because its associated switch 34 was opened by the turned "on" gate 31).

The $C_{ij}$ and $C'_{ij}$ connections of networks 20 and 40 can be implemented by physically affixing the $M_{ij}$ bits of the stored vectors within the circuitry that realized the $C_{ij}$ and $C'_{ij}$ connections within networks 20 and 40. It makes for a more versatile circuit, however, when the $M_{ij}$ bits can be stored in networks 20 and 40 in an alterable way, such as within accessible memory cells.

Figure 3:
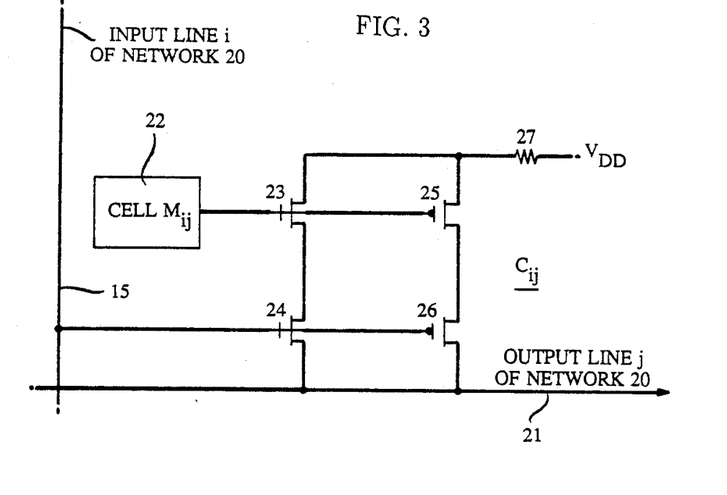
FIGS. 3 and 4 illustrate one realization for implementing the $C_{ij}$ and $C'_{ij}$ connections of the FIG. 1 networks.

FIG. 3 depicts one embodiment for developing the $C_{ij}$ connections of network 20 through the use of memory cells. Line 15 is an input line of network 20 and line 21 is an output line of network 20. Block 22 is a cell, e.g., a flip-flop, which holds the value of $M_{ij}$. To obtain the required EXNOR connectivity described above, the required logical function that must be developed is $V_j \cdot M_{ij} + \overline{V}_j \cdot \overline{M}_{ij}$. This logical function is realized in FIG. 3 with the arrangement of transistors 23, 24, 25 and 26. Transistor 24 is turned "on" by a true value on line 15 while transistor 23 is turned "on" by a true value at the output of cell 22. Transistors 23 and 24 are connected in serial fashion and interposed between a voltage source $V_{DD}$ (to which resistor 27 is connected) and line 21. In parallel with the serial connection of transistors 23 and 24 is a serial connection of transistors 25 and 26. Transistors 25 and 26 are turned "on" by a false value at the output of cell 22 and on line 15, respectively.

Figure 4:
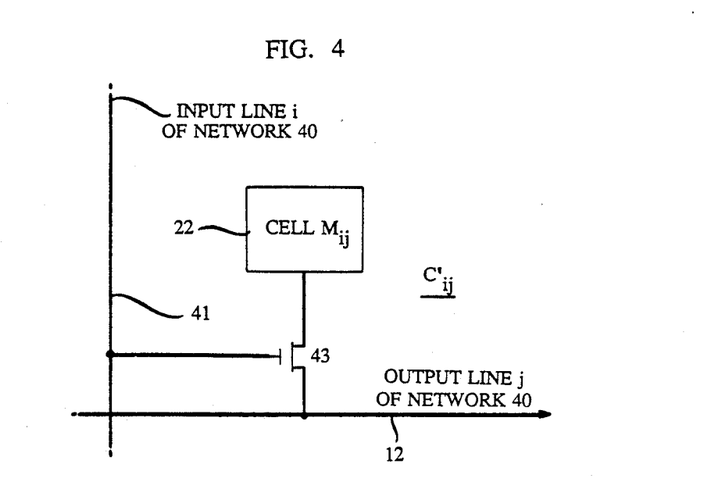

FIG. 4 depicts one embodiment for developing the $C'_{ij}$ connections of network 40. Line 12 is an output line of network 40 and line 41 is an input line of network 40. As in FIG. 3, block 22 is a cell which holds the value of $M_{ij}$, and that value is communicated to line 12 via transistor switch 43, under control of line 41.

Figure 5:
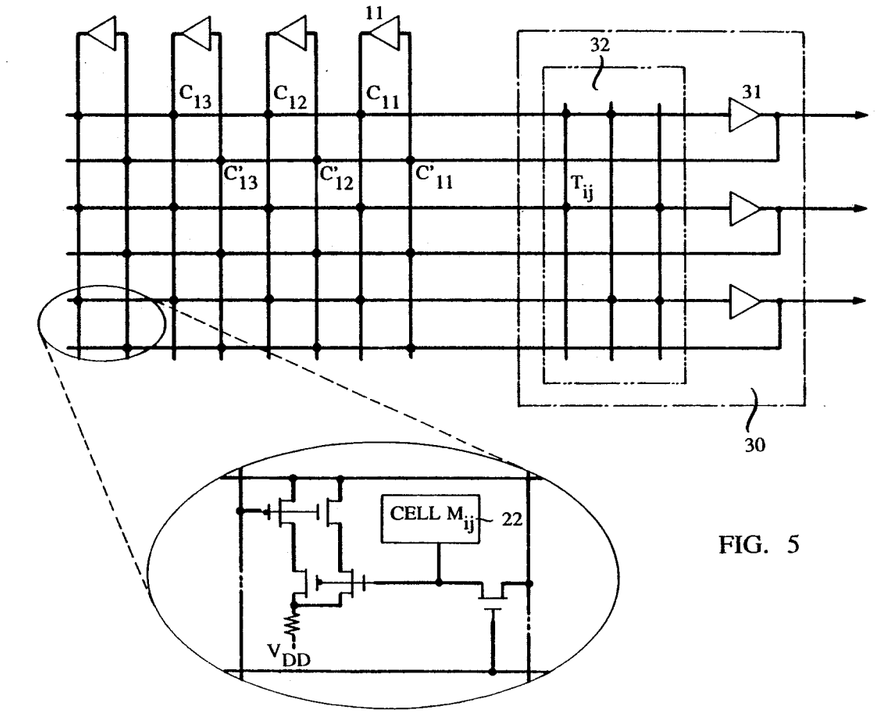
FIG. 5 depicts a physically rearranged structure of my FIG. 1 network that interleaves networks 20 and 40 and thereby permits the use of a single memory cell for each bit in the set of stored vectors to control both networks.

Recognizing that $C_{ij}$ and $C'_{ij}$ are both controlled by cells 22 in the above-described embodiments, it is clear that VLSI implementation advantages can be had by combining networks 20 and 40. FIG. 5 illustrates one way for interleaving the input and output lines of networks 20 and 40 so that any cell 22 can easily control the necessary current flow. The input and output lines of amplifiers 11 form columns in FIG. 5, and the input and output lines of amplifiers 31 form rows in FIG. 5. The nodes where output column lines and input row lines intersect contain the $C_{ij}$ connections, and the nodes where output row lines and input column lines intersect contain the $C'_{ij}$ connections. For sake of clarity, FIG. 5 includes a blow-up of a portion in FIG. 5 that encompasses both a C and a C' connection, illustrating the fact that a single $M_{ij}$ cell controls both connections.

Although the connections to, and from, cells 22 are not shown in FIG. 5, it is easy to appreciate that the various cells storing the $M_{ij}$ bits in the structure of FIG. 5 can be interconnected in a serial, shift register, fashion to permit loading of the $M_{ij}$ values of the vectors to be stored from 1, N, or K ports, as desired; or arranged to be addressed as a conventional RAM.

The arrangement of FIG. 1 includes amplifier network 10, which provides regeneration and a degree of isolation between the shown input and output ports. In some applications, however, it may be desirable to do without amplifiers 11. This can be accomplished by replacing the current drive supplied by $C'_{ij}$ with a corresponding voltage drive (low source impedance) that is applied directly to network 20. This is tantamount to a collapsing of the column pairs in the FIG. 4 illustration, which leads to the drawing of FIG. 6. Thus, FIG. 6 includes a K-flop neural network 30 and an input interconnection network 50 having one output port of K leads which applies signals to network 30, one input port of K leads which receives signals from network 30, and one input/output port of N leads which serves as an interface to the FIG. 6 network. As in FIG. 1, K is the number of stored vectors and N is the number of bits per vector. In accordance with the above, each output $E_j$ of network 30 contributes a current drive to the $i^{th}$ amplifier 31 via a connection $$D_{ij}=\text{EXNOR}(\text{AND}(E_j,M_{ij}),M_{ij}).$$

Figure 6:
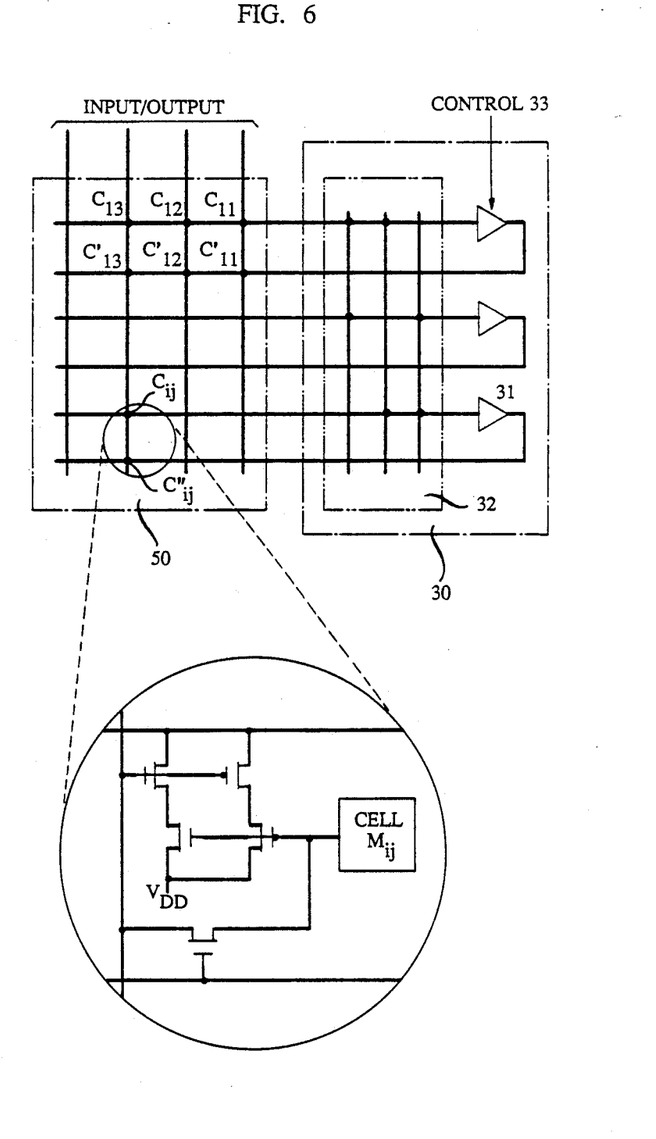
FIG. 6 illustrates a different schematic diagram of my associative computation network.

One embodiment of this logical interconnection arrangement is depicted in the blow-up portion of FIG. 6.

Figure 7:
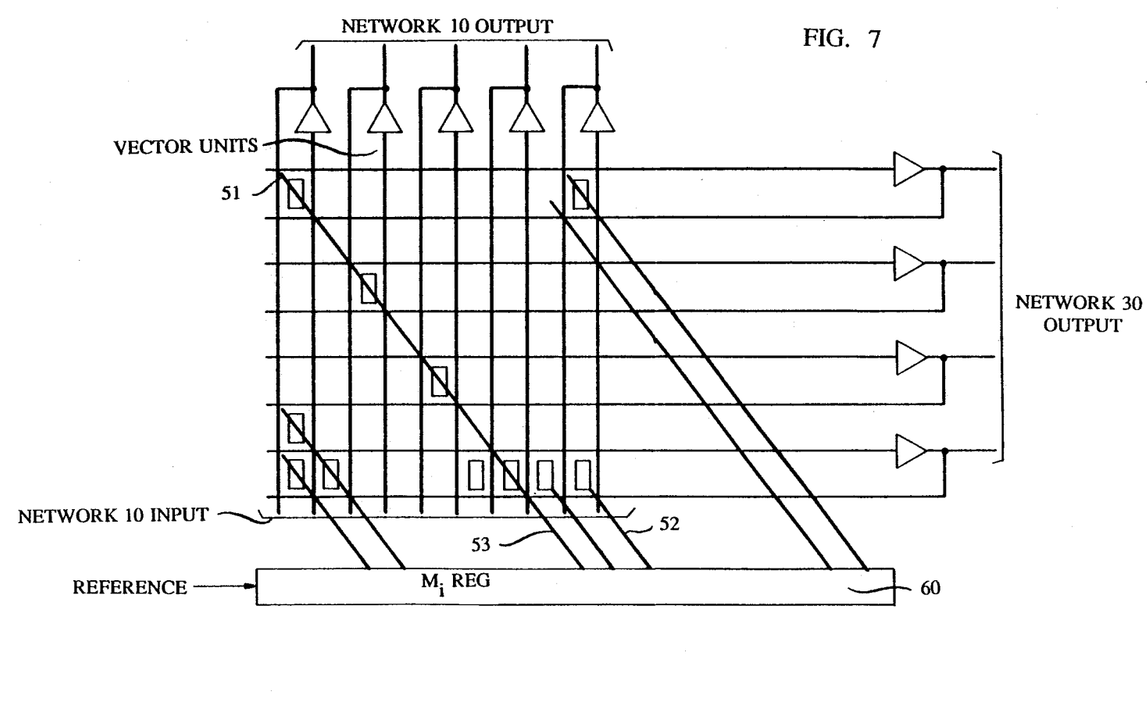
FIG. 7 presents a correlator application of my associative computation network.

FIG. 7 presents an interesting application of my neural network. Often it is desirable to perform a cross-correlation computation (or an auto-correlation computation) on an incoming signal. A cross-correlation can be performed, for example, by sampling the signal against which the cross-correlation of an input signal is to be evaluated, to develop a vector M (comprising N bits) and storing vector M as one of the vectors in networks 20 and 40. Shifted replicas of M are then stored as the other vectors of networks 20 and 40. This arrangement is shown in FIG. 7, wherein register 60 is loaded with a reference signal M and the different components of M are loaded into the various cells 22 of FIG. 7 in a staggered fashion to effect the aforedescribed storing of delayed replicas of M. This is shown diagrammatically in FIG. 7 by dashed lines 51, 52 and 53. In operation, an input signal is applied at the input/output port of the FIG. 7 network, yielding shortly thereafter an output vector at the input/output port that is closest to the applied signal. The input and output ports of network 30 give a different and, perhaps, a more useful indication in a correlator application. The output port of network 30 delivers a vector with one component being high, or "1", and the other components being low. The component that is high identifies the particular delayed replica of M that best correlates with the input signal. The input port to network 30 provides the actual correlation values.

Although a number of embodiments have been disclosed herein, still different embodiments and applications will, no doubt, suggest themselves to those who are skilled in art to which this invention pertains, without departing from the spirit and scope of this invention. For example, the above descriptions do not specifically state that the voltages developed by amplifiers 11 and 31 can be any alterable analog values, but such a realization falls squarely within the contemplation of my invention.

Figure 8:
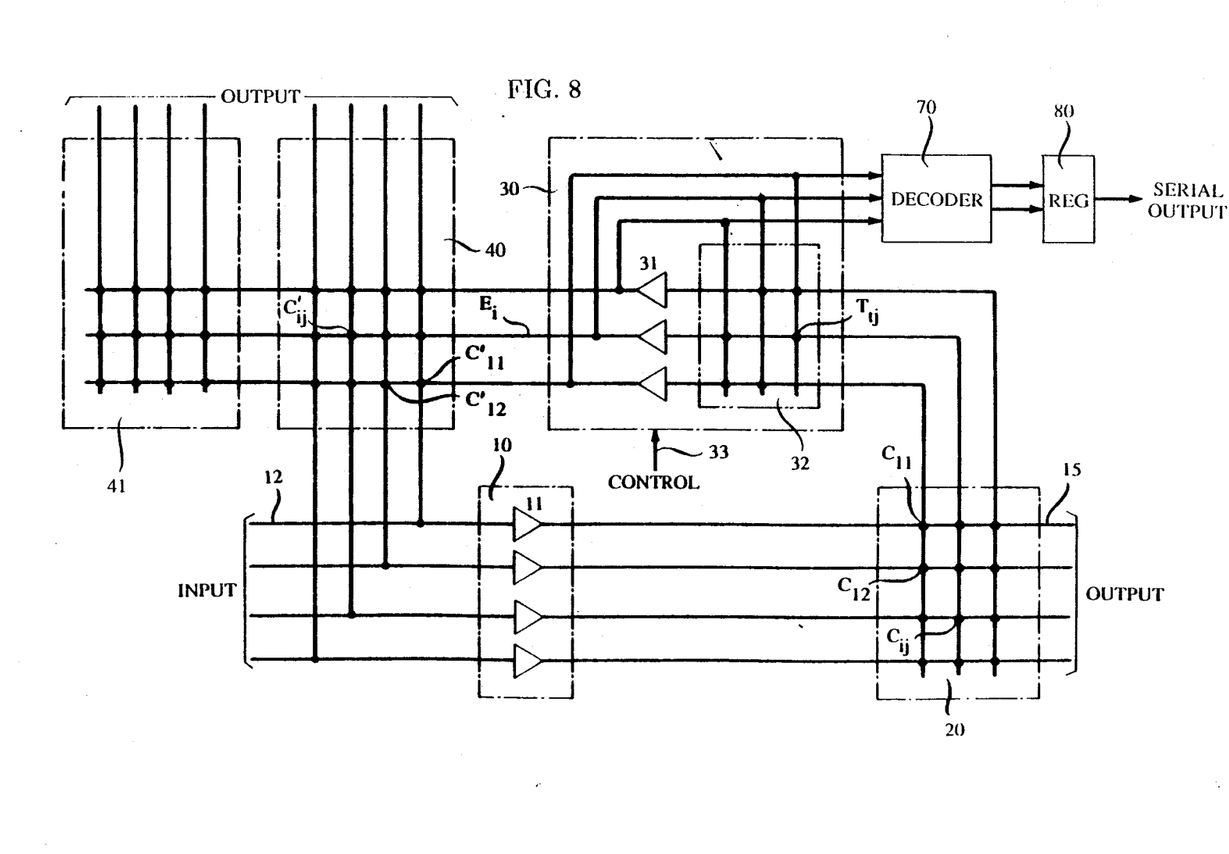
FIG. 8 illustrates the various storage arrangements and output ports of the FIG. 1 network that may be useful in different applications.

In still another example, the concept of using an output other than the output of projection network 20 (in FIG. 1) may be expanded. To illustrate, the output signals of network 30 are as indicative of the selected memory as are the outputs of network 20 and the drive signals of network 40. When network 30 is a K-flop, the output of network 30 is very simple (a "1" in the $p^{th}$ output lead means that the $p^{th}$ vector was selected) and that output can be employed, in encoded or in unencoded form, as the output of the network. Thus, the output of the FIG. 1 network can be derived as shown in FIG. 8, by encoding the outputs of network 30 with encoder 70, loading the encoded output into shift register 80 and extracting the output signals of the FIG. 8 network from the serial output of register 80. This, of course, reduces the number of leads required to interface with the FIG. 8 network. A network 30 that is other than the K-flop can, perhaps, do even without encoder 70.

Also shown in FIG. 8 is a network 40 which employs the drive signals to network 10, plus some additional output leads from an auxiliary network 41, as the output signals of the FIG. 8 network. This permits the FIG. 8 network to operate more than just a content addressable memory which outputs the closest replica of its input. The additional outputs from network 41 can provide whatever additional information it is desired to be stored for each vector. Network 41 is driven by the output signals of network 30.

The circuit of FIG. 8 is very effective when seeking "singleton" matches. That is, it is very effective when one and only one of the stored templates is to be selected as the template that best matches the input signal. This "one and only one" aspect is enforced by network 30, in combination with network 40 and the feedback connection to network 10.

Sometimes, however, it may be useful to uncover all of the stored templates that happen to resonate with the input signal. For example, when one searches for horizontal and vertical lines in a hand-written character, (e.g. when trying to classify a "4"), it is useful to have a circuit that identifies both features concurrently.

Dispensing with networks 30 and 40 and where appropriate, adding network 90 as shown in FIG. 9 yields such a circuit.

In FIG. 9, network 29 is a vector units network like the network of FIG. 1. It stores different vectors in different columns of the network. That is, each input line (row), j, is connected to each output line (column), i, through a connection strength $C_{ij}$. Each column of connection strengths (the collection of $C_{ij}$'s for a particular i) defines the stored vector.

The concept of a "connection strength" is fairly generic. FIG. 3 describes an EXNOR realization where each $C_{ij}$ is either a 1 or a 0. The values of $C_{ij}$ match the corresponding bit value of the stored vector. Other arrangements are, of course, also possible. For example, for character recognition templates it was found useful to include a "don't care" $C_{ij}$ value. Moreover, it was found useful to treat an excitatory match differently from an inhibitory match, as depicted by the truth table below.

| input | synapse | output |
|-------|---------|--------|
| 0 | E | 0 |
| 1 | E | 1 |
| 0 | I | 0 |
| 1 | I | −2 |
| 0 | D | 0 |
| 1 | D | 0 |

Such a truth table can be easily realized with gated current amplifiers.

The information of whether a connection is an E (excitatory), I (inhibitory), or D (didn't care) connection, can be stored in a two flip-flop set associated with each $C_{ij}$ (when variability is desired). Alternatively, the information can be "hardwired" with an array of links associated with the array of connection. With such an arrangement, the programming of templates (i.e., $C_{ij}$ connections) can be achieved through a burn-through of the appropriate links. Of course, if the templates are completely unchanging, one can design the template information directly into the integrated circuit mask of network 29.

The current flowing in an output line of network 29, which is the sum of the currents of the gated amplifiers connected to the output line, drives an impedance, and that causes the voltage of each output line of network 29 to rise to a level that is proportional to the degree of match between 1's in the set of input signals and excitatory connections. Of course, the voltage is also diminished by the degree of match between 1's in the set of input signals and the inhibitory connections, as indicated by the above table. The impedance can be placed at the output of network 29, or at the input of network 90.

The output lines of network 29 are applied to threshold network 90. Network 90 applies a set of thresholds to the output signals of network 29. Specifically, network 90 comprises a set of two-input amplifiers (e.g., 91-94) having one input responsive to the input leads of network 90, and a number of current sources (e.g., 95-97) that connect to the second input of amplifiers 91-94. Each of the sources supplies a different current and, correspondingly, each amplifier 91-94 develops a voltage on its second lead that is related to the specific connection that its input has to sources 95-97. In this manner, different thresholds can be applied to the different amplifiers within network 90. The output leads of network 90 are the outputs of amplifiers 91-94, and they take on the logic value 1 or 0, depending on whether the signal input of an amplifier exceeds the threshold or not.

What is claimed is:

1. A network for storing K vectors $M_i$, where i is an index in the range 1 to K designates a particular vector, and each vector $M_i$ has components $M_{ij}$ where j is an index in the range 1 to L designates the component number of the vector, K and L being integers, comprising:

a decision network for developing at output ports of said decision network signals that indicate recognition of a degree of presence of said vectors within input signals appearing at input ports of said decision network; and an interconnection network having K input leads connected to said output ports and output leads connected to said input ports, and L network interface leads, where each of said network interface leads, i, is connected to each output lead of said interconnection network, j, through a connection $C_{ij}$ and to each input lead of said interconnection network j, through a connection $C'_{ij}$, and where said $C_{ij}$ and $C'_{ij}$ connnections are related only to components j of vector i from among said K vectors.

2. The network of claim 1 wherein said $C_{ij}$ connections develop signals at said input ports of said decision network that are related to the projections of signals on said network interface leads on said K vectors.

3. The network of claim 1 wherein each set of said $C_{ij}$ connections for a selected value of j develop a signal at a $j^{th}$ output lead of said interconnection network that is related to the projection of signals on said network interface leads on one of said K vectors.

4. The network of claim 1 wherein said $C'_{ij}$ connections develop signals for driving said interconnection network to a state where signals on said network interface leads correspond to one of said K vectors.

5. The network of claim 1 wherein said decision network is a K-flop network and each set of said $C'_{ij}$ connections for a given subscript j is related to one of said K vectors.

6. The network of claim 5 wherein each set of said $C_{ij}$ connections develops signals at said input ports of said K-flop network that are related to the projections of said signals at said network interface leads on said K vectors.

7. The network of claim 5 wherein each vector $M_j$ of said K vectors comprises bits $M_{ij}$, and each of said $C'_{ij}$ forms an excitatory connection when $M_{ij}=1$ and an inhibitory connection when $M_{ij}=0$.

8. The network of claim 5 wherein each vector $M_j$ of said K vectors comprises bits $M_{ij}$ and wherein $C_{ij}=\text{AND}(V_j,M_{ij})$, where $V_j$ is a signal on a $j^{th}$ lead of said network interface leads.

9. The network of claim 5 wherein each vector $M_j$ of said K vectors comprises bits $M_{ij}$ and wherein $C_{ij}=\text{EXNOR}(V_j,M_{ij})$, where $V_j$ is a signal on a $j^{th}$ lead of said network interface leads.

10. The network of claim 5 wherein each vector $M_j$ of said K vectors comprises bits $M_{ij}$, and wherein $C'_{ij}=\text{AND}(E_j,M_{ij})$, where $E_j$ is a $j^{th}$ output of said K-flop.

11. A network for storing K vectors comprising:
    a decision network having input ports and output ports for developing an output signal at said output ports indicative of the input port with the largest signal; and
    an interconnection network having input leads connected to said output ports, output leads connected to said input ports, and network interface leads, where each of said network interface leads, i, is connected to each output lead of said interconnection network, j, through a connection $C_{ij}$ and to each input lead of said interconnection network, j, through a connection $C'_{ij}$, and where said $C_{ij}$ and $C'_{ij}$ connections associated with each lead j is related only to a chosen one of said K vectors.

12. A network for storing K vectors where each vector $M_i$ includes bits $M_{ij}$, comprising:
- a decision network having K input ports and K output ports for developing an output signal at said output ports indicative of the input port with a largest signal; and
- an interconnection network having K input leads connected to said K output ports, K output leads connected to said K input ports, N network input leads, and N vector output leads, where each of said vector output leads, i, is connected to each output lead of said interconnection network, j, through a connection $C_{ij}$, each corresponding network input lead, i, is connected to each input lead of said interconnection network, j, through a connection $C'_{ij}$, and said $C_{ij}$ and $C'_{ij}$ connections are related to said K vectors.

13. The network of claim 12 wherein said decision network is a K-flop network and each of said $C_{ij}$ and $C'_{ij}$ connections is related to said $M_{ij}$.

14. The network of claim 13 further comprising amplifiers interposed between said interconnection network input leads and said interconnection network vector output leads.

15. The network of claim 13 further comprising N amplifiers, each having an input lead connected to one of said network input leads and an output lead connected to said corresponding one of said interconnection network vector output leads.

16. A network sensitive to K vectors, each describable by N bits, comprising:
- an input port including N input leads for accepting applied input signals;
- an amplification network responsive to said N input leads, for developing N output signals;
- a template projection network responsive to said N output signals for developing K projection signals, each indicative of the projection of said N output signals on a different one of said K vectors;
- a decision network responsive to said K projection signals for developing K drive signals indicative of the largest of said K projection signals; and
- a template generator network responsive to said K drive signals for developing N template generation signals, applied to said N input leads, for driving said N output signals to a state corresponding to one of said K vectors.

17. A network for storing K vectors of N bits each where each vector $M_j$ with j assuming values from 1 to K, includes bits $M_{ij}$, with i assuming values from 1 to N, comprising:
- K amplifiers having input ports and output ports;
- a feedback network having K output leads connected to said input ports of said amplifiers and K input leads connected to said output ports of said amplifiers, with each input lead, i, of said feedback network connected within said feedback network to each output lead, j, of said feedback network through an inhibitory connection of a first fixed value for all $i \neq j$; and
- an interconnection network having K input leads connected to said output ports of said amplifiers, K output leads connected to said input ports of said amplifiers, and N network interface leads, where each interface lead, i, is connected to each output lead of said interconnection network, j, through a connection $C_{ij}$, and to each input lead of said interconnection network, j, through a connection $C'_{ij}$, and where both said $C_{ij}$ and $C'_{ij}$ connections are related to said $M_{ij}$.

18. The network of claim 17, further including control means for disabling said K amplifiers.

19. The network of claim 1 further comprising control means connected to said decision network for disabling all output signals at said output ports.

20. The network of claim 1, developing output signals responsive to signals appearing at said output ports of said decision network.

21. The network of claim 1 further comprising a network output port and shift register means interposed between said network output port and said output ports of said decision network.

22. The network of claim 21 further comprising encoding means interposed between said shift register means and said output ports of said decision network.

23. The network of claim 1 further comprising a network output port and encoder means interposed between said network output port and said output ports of said decision network.

24. The network of claim 12 further comprising network output ports responsive to signals on said N interconnection network vector output leads.

25. The network of claim 12 further comprising a network output port and shift register means connected to said network output port and responsive to said interconnection network vector output leads.

26. The network of claim 1 further comprising network output leads connected to said interconnection network interface leads.

27. The network of claim 26 further comprising an auxiliary network, responsive to said K output ports of said decision network, for developing signals for additional output leads of said network.

28. A network for selecting a best match for an applied input signal having N components from among a stored set of M template signals having N components, where N, and M are integers, comprising:
- a first template network having N inputs and M outputs, with connection strength means for each input i for affecting the output of each output j, i and j being integers in the range 1 to N and 1 to M, respectively; and
- threshold means responsive to said M outputs for applying a threshold to said M outputs,
- wherein said connection strength means between an output j and the N inputs correspond to one of said stored templates and to no other of said stored templates.

29. The network of claim 28 wherein said connection strength means between input i and output j increases current in one direction along said output when said input is at a first logic level.

30. The network of claim 28 wherein said connection strength means between input i and output j increases current in one direction along said output when said input is at a first logic level and diminishes current in said direction along said output when said input is at a second logic level.

31. The network of claim 28 wherein said connection strength means between input i and output j is either E (excitatory) or I (inhibitory) connection, were an E connection increases current in one direction along said output when said input is at a first logic level, and an I connection diminishes current in said direction along said output wherein said input is at said first logic level.

32. The network of claim 28 wherein said connection strength means between input i and output j is either E (excitatory), I (inhibitory), or D (don't care) connection, were an E connection increases current in one direction along said output when said input is at a first logic level, an I connection diminishes current in said direction along said output wherein said input is at said first logic level, and a D connection does not affect said current.

33. The network of claim 33 wherein the effect of an E connection is different in magnitude from the effect of an I connection.

34. The network of claim 28 wherein said threshold means includes means for different threshold to different ones of said M outputs.

35. The network of claim 28 wherein said threshold means is an M input M-flop for developing a set of M output signals, only one of which is at one logic level while the remaining M-1 output signals are at another logic level.

36. The network of claim 28, further comprising:
 a second template network having M inputs and at least N1 outputs with connection strength means for each input i for affecting the output of each output i, i and j being integers in the range 1 to N and 1 to M, respectively; and
 means for connecting outputs of said second template network to inputs of said first template network.

* * * * *